US010554895B2

(12) United States Patent
Yoshida et al.

(10) Patent No.: US 10,554,895 B2
(45) Date of Patent: Feb. 4, 2020

(54) INFORMATION PROCESSING APPARATUS

(71) Applicant: Olympus Corporation, Hachioji-shi, Tokyo (JP)

(72) Inventors: Hideaki Yoshida, Tokyo (JP); Hisayuki Harada, Tokyo (JP); Toshikazu Hayashi, Tokyo (JP); Keiji Okada, Tokyo (JP); Osamu Nonaka, Sagamihara (JP); Yuichi Tsuchimochi, Tokyo (JP)

(73) Assignee: Olympus Corporation, Tokyo (JP)

( * ) Notice: Subject to any disclaimer, the term of this patent is extended or adjusted under 35 U.S.C. 154(b) by 20 days.

(21) Appl. No.: 15/946,708

(22) Filed: Apr. 5, 2018

(65) Prior Publication Data
US 2018/0332229 A1  Nov. 15, 2018

(30) Foreign Application Priority Data
May 9, 2017   (JP) ................................. 2017-093038

(51) Int. Cl.
*H04N 5/232* (2006.01)
*G06T 7/00* (2017.01)
*H04N 13/246* (2018.01)
*G06T 7/80* (2017.01)

(52) U.S. Cl.
CPC ........... *H04N 5/23293* (2013.01); *G06T 7/85* (2017.01); *H04N 5/23216* (2013.01); *H04N 5/23222* (2013.01); *H04N 13/246* (2018.05)

(58) Field of Classification Search
CPC ............. H04N 5/23293; H04N 13/239; H04N 13/296; H04N 5/23216; H04N 13/246; H04N 5/23222; G06T 7/85; G06T 2207/10012
See application file for complete search history.

(56) References Cited

U.S. PATENT DOCUMENTS

| 2011/0298900 | A1* | 12/2011 | Inaba | G02B 27/2264 348/47 |
| 2012/0056998 | A1* | 3/2012 | Kang | H04N 13/239 348/47 |
| 2012/0147150 | A1* | 6/2012 | Kojima | G01C 3/085 348/50 |
| 2012/0182403 | A1* | 7/2012 | Lange | G02B 27/22 348/51 |
| 2013/0162784 | A1* | 6/2013 | Ueda | H04N 5/23212 348/49 |
| 2014/0022246 | A1* | 1/2014 | Ono | H04N 5/76 345/419 |

(Continued)

FOREIGN PATENT DOCUMENTS

| JP | 2015-001146 | 1/2015 |
| JP | 2016-021603 | 2/2016 |

*Primary Examiner* — Shahbaz Nazrul
(74) *Attorney, Agent, or Firm* — John C. Pokotylo; Pokotylo Patent Services

(57) ABSTRACT

An information processing apparatus includes: a visual field determination section 122 that determines, for a predetermined subject distance and on the basis of two images with different parallaxes that have been captured by a plurality of imaging units that perform three-dimensional image shooting, a common visual field range of the two images with different parallaxes; and a display controller 138 that displays, on a display, information on the determined common visual field range.

13 Claims, 13 Drawing Sheets

(56) References Cited

U.S. PATENT DOCUMENTS

| | | | |
|---|---|---|---|
| 2014/0286566 A1* | 9/2014 | Rhoads | G06T 3/4038 |
| | | | 382/154 |
| 2015/0229905 A1* | 8/2015 | Shim | G06T 19/00 |
| | | | 345/419 |
| 2016/0014388 A1* | 1/2016 | Takimoto | G06T 7/97 |
| | | | 348/43 |
| 2017/0076457 A1* | 3/2017 | Hayashi | G06T 5/006 |
| 2018/0213148 A1* | 7/2018 | Yoshida | H04N 5/232935 |
| 2018/0225839 A1* | 8/2018 | Yoshida | G06K 9/00201 |

* cited by examiner

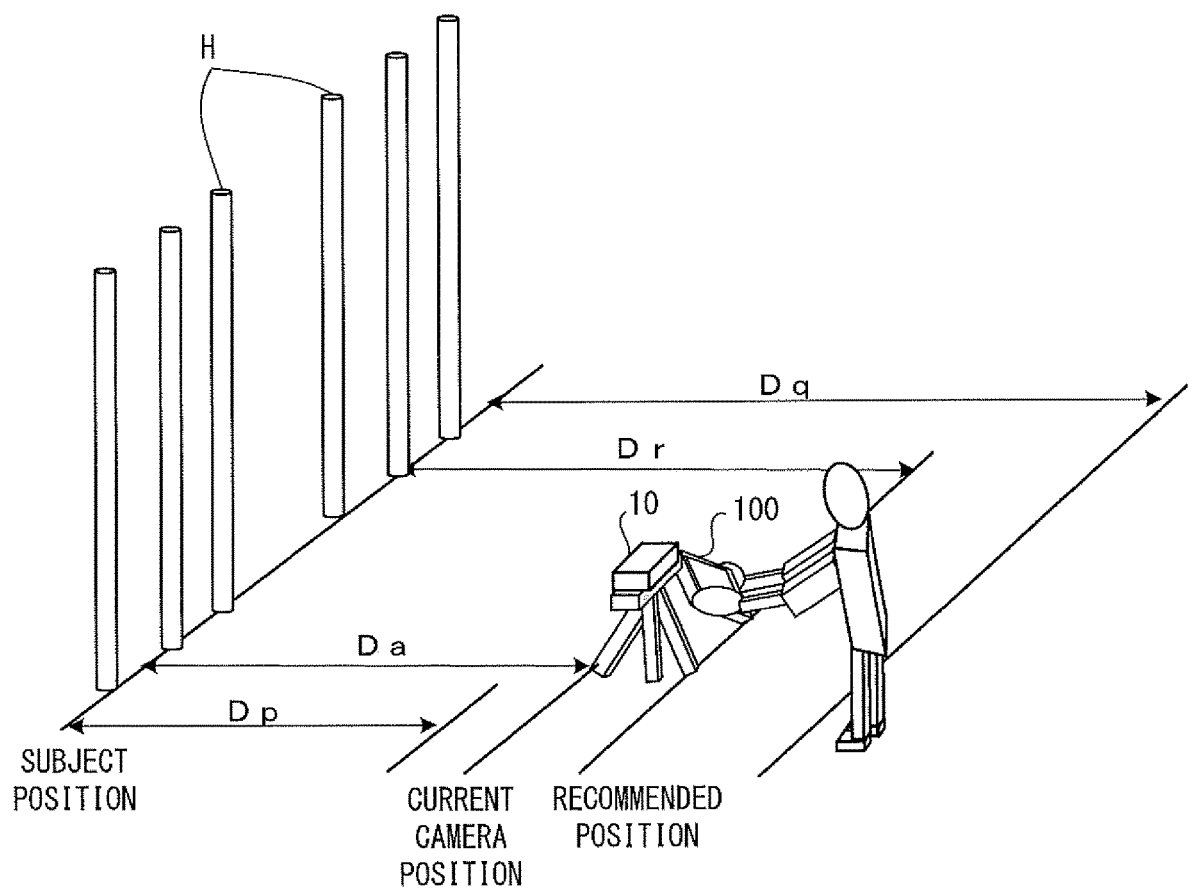
F I G. 9 A

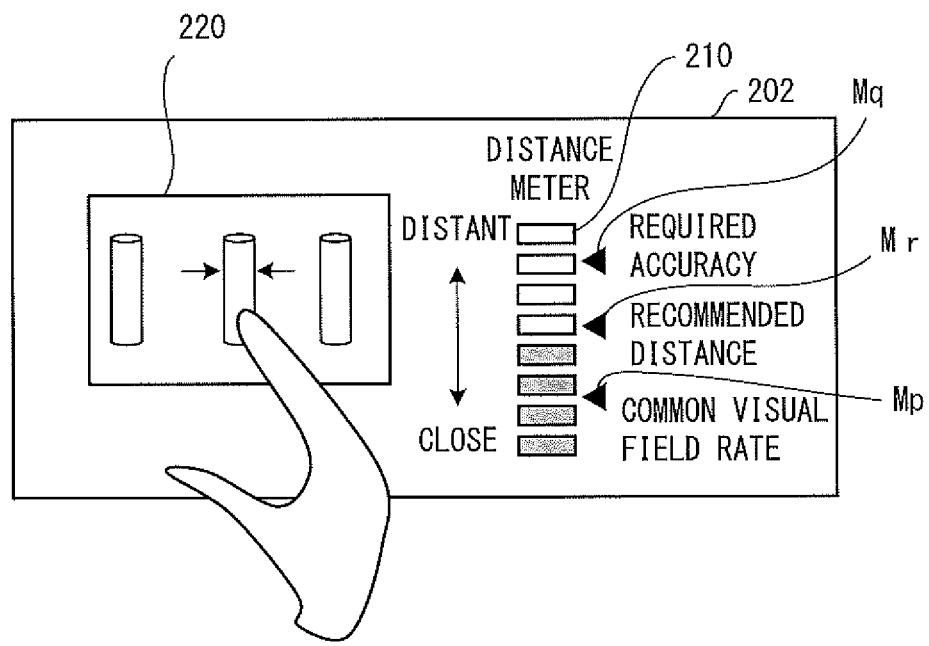
F I G. 9 B

INFORMATION PROCESSING APPARATUS

CROSS-REFERENCE TO RELATED APPLICATIONS

This application is based upon and claims the benefit of priority of the prior Japanese Patent Application No. 2017-093038, filed on May 9, 2017, the entire contents of which are incorporated herein by reference.

BACKGROUND OF THE INVENTION

Field of the Invention

The present invention relates to an information processing apparatus for assisting three-dimensional image shooting.

Description of the Related Art

Image data obtained by a digital camera allows hundreds to thousands images to be easily managed. Accordingly, image shooting of construction states using a digital camera at construction sites has often been utilized as evidence to show that constructions are correctly performed.

According to such image shooting of construction states, image-based evidence is preserved to indicate, for example, construction members that were used and, in particular, to indicate that reinforcing bars with correct diameters were used or that the reinforcing bars were arranged at correct intervals. Conventionally, in such image shooting of reinforcing bars, a measure has been set along reinforcing bars with markers placed thereon as scales so that the diameters of the reinforcing bars and the intervals therebetween can be checked in the image.

However, preparation tasks such as setting a measure adjacent to reinforcing bars and placing markers on each reinforcing bar are troublesome. Depending on a building scale, the preparation tasks could have required a long time to shoot hundreds to thousands images at one site, thereby leading to a great number of man-hours. Accordingly, a technique has been proposed for performing such image shooting of reinforcing bars so as to obtain an image of the reinforcing bars according to what is called three-dimensional (3D) image shooting, which is performed by shooting images using two imaging units with a parallax (e.g., patent document 1).

Using three-dimensional image shooting for detection of reinforcing bars enables a distance to a subject to be precisely detected, thereby eliminating the need to attach a measure or markers to the reinforcing bar, so that the time required for one image shooting operation can be greatly reduced. In three-dimensional image shooting, a subject is detected in a common visual field region of two imaging units, and the distance to the subject can be geometrically calculated from the difference in detection position between the two imaging units. The size of the subject can be calculated from the distance to the subject.

Hence, precisely determining the size of a subject in three-dimensional image shooting requires that the subject be located in a common visual field region. Thus, the two imaging units desirably have a wide common visual field region during three-dimensional image shooting.
Patent Document 1: Japanese Laid-open Patent Publication No. 2015-1146

SUMMARY OF THE INVENTION

An information processing apparatus in accordance with the embodiment includes: a controller including, a visual field determination section that determines, for a predetermined subject distance and on the basis of two images with different parallaxes that have been captured by a plurality of imaging units that perform three-dimensional image shooting, a common visual field range of the two images with different parallaxes; and a display controller that displays, on a display, information on the determined common visual field range.

BRIEF DESCRIPTION OF THE DRAWINGS

FIG. 9A illustrates a relationship between a subject distance, a required value for a common visual field rate, a required accuracy, and some other elements;
FIG. 9B illustrates a second guide screen.

DETAILED DESCRIPTION OF THE PREFERRED EMBODIMENTS

Figure 1:
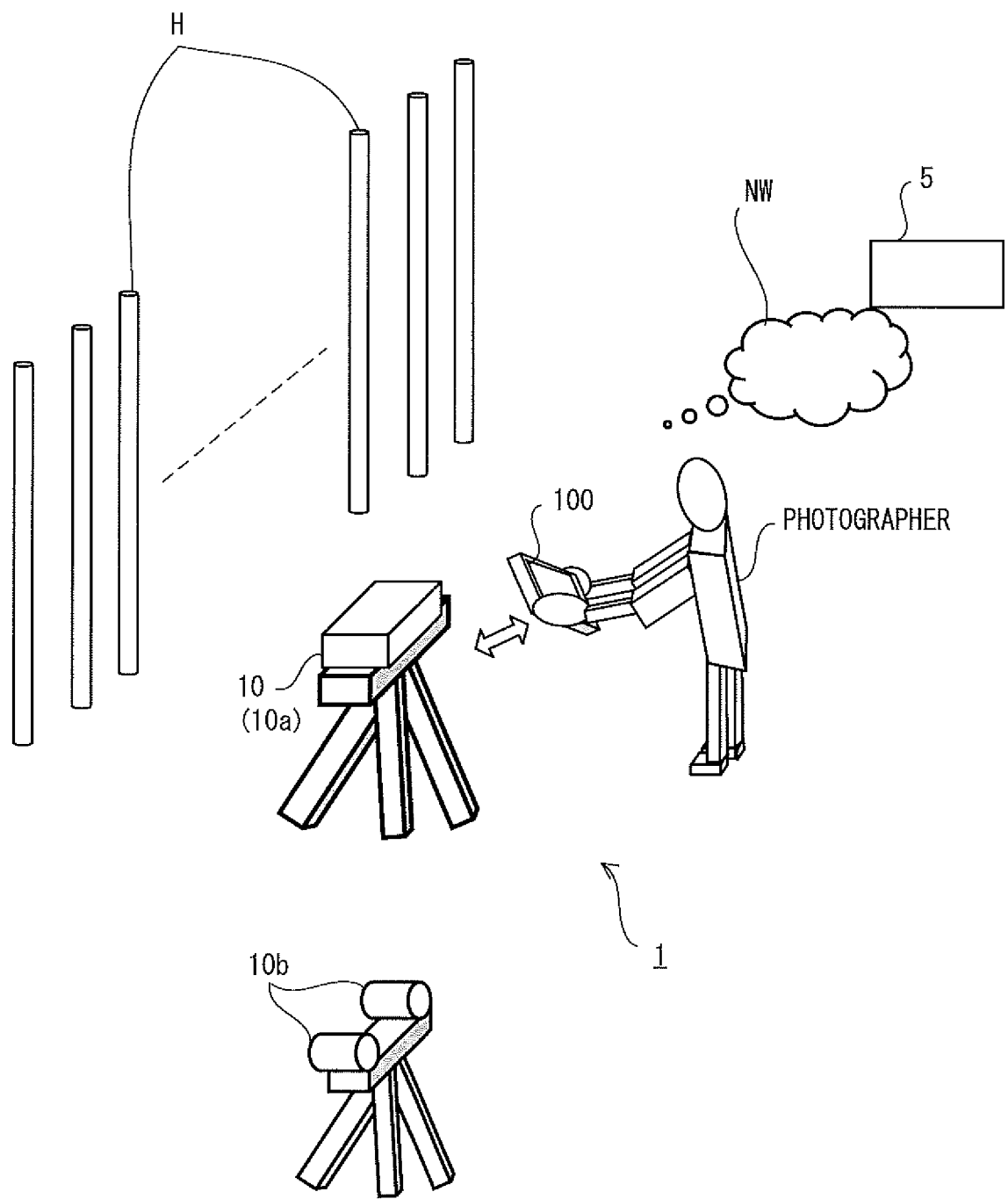
FIG. 1 illustrates image shooting performed at a construction site.

The following describes embodiments of the present invention in accordance with the drawings. The embodiments described in the following are based on an example in which an information processing apparatus of the invention is used for construction image shooting. Construction image shooting refers to image shooting for obtaining evidence photographs of construction details at a construction site. FIG. 1 illustrates construction image shooting.

In the example of FIG. 1, a three-dimensional image shooting system 1 is used at a construction site with a plurality of reinforcing bars H chosen as subjects. The three-dimensional image shooting system 1 comprises an image shooting device and an information processing apparatus 100. The image shooting device is a camera 10 mounted on a tripod. A photographer shoots images by controlling the camera 10 using the information processing apparatus 100 and stores captured image data in the information processing apparatus 100. The camera 10 may be a stereo camera 10a or may be two monocular cameras 10b mounted on a tripod.

The information processing apparatus 100 and the camera 10 are coupled to each other by a wired link (e.g., a USB cable) or wirelessly (e.g., a wireless local area network (LAN)). Captured three-dimensional image data may be transmitted from the information processing apparatus 100 to an external server 5 over a network NW and accumulated in the external server 5. The information processing apparatus 100 may be integral with the camera 10.

A basic principle of three-dimensional image shooting is such that a subject is detected within a common visual field range of two (a pair of) imaging units so as to perform geometrical calculation from the difference in position between images detected by the two imaging units. Hence, the two imaging units having a wide common visual field range allows three-dimensional image shooting to be performed efficiently.

Figure 2:
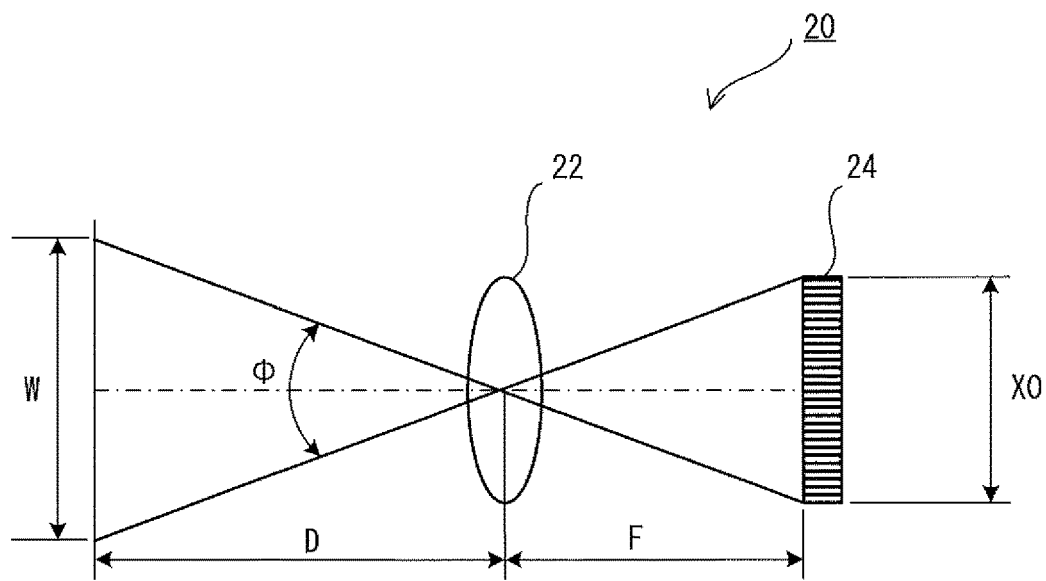
FIG. 2 illustrates a visual field range provided by a lens and an image sensor.

FIG. 2 illustrates a relationship between a visual field range (extending in a width direction) and a lens 22 and image sensor 24 of the right or left imaging unit 20 of the stereo camera 10a. In this example, the imaging unit 20 is a fixed focusing system. As for parameters, W indicates an image-shooting range, X0 indicates the horizontal length of the image plane length of the image sensor 24, φ indicates the angle of view of the lens 22, F indicates the image-plane distance of the lens 22, and D indicates a subject distance. When a subject is at infinite distance, the image-plane distance F is equal to a focal distance.

Figure 3:
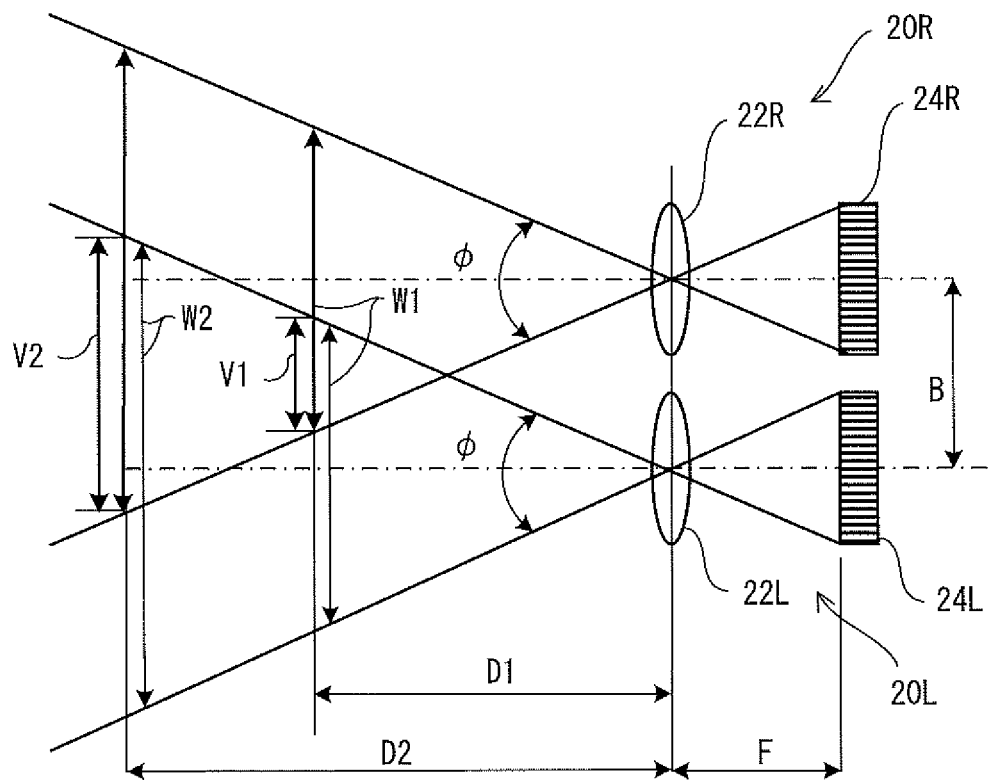
FIG. 3 illustrates a relationship in a common visual field range of right and left imaging units.

FIG. 3 illustrates a relationship between the monocular image-shooting range of right and left imaging units 20 (right imaging unit 20R and left imaging unit 20L) of the camera 10 and the common visual field range of the right and left imaging units 20. Descriptions to be given with reference to FIG. 2 are based on one-dimensional system (this is because binocular stereo imaging is essentially based on one-dimensional system in the sense that it has a parallax only in one direction). The right and left imaging units may be collectively referred to as imaging units 20.

In the camera 10, the right and left imaging units 20 are horizontally aligned in a manner such that the visual lines (image-shooting optical axes) thereof become parallel to each other. The right imaging unit 20R and the left imaging unit 20L share the same specification. Hence, in shooting an image of a subject at infinite distance, a common visual field rate of 100% is achieved. In FIG. 3, F indicates an image-plane distance, D1 and D2 indicate subject distances, X0 indicates the horizontal length of the image-plane length of the image sensor 24 (image sensor 24R, image sensor 24L) (see FIG. 2), B indicates a base line length, φ indicates an angle of view, and V indicates a common visual field range (length).

W1, which indicates a monocular image-shooting range (length) for the subject distance D1 (subject plane), satisfies W1/D1=X0/F according to a similarity relationship between triangles in the plot of the imaging system and thus fulfils the following formula (1).

$$W1 = D1 \cdot X0/F \quad \text{Formula (1)}$$

V1, which indicates a common visual field region for the subject distance (subject plane), is narrower than W1 by the base line length B, thereby satisfying the following formula (2).

$$V1 = W1 - B \text{ or } V1 = (D1 \cdot X0/F) - B \quad \text{Formula (2)}$$

What is described above is also true for W2, which indicates a monocular image-shooting range for the subject distance D2, and V2, which indicates a common visual field region (length) for the subject distance D2. The only unknown quantity in formula (2) is D with the other marks representing predetermined quantities, and hence calculations can be readily performed if the subject distance D is determined through phase difference ranging. The monocular image-shooting ranges W1 and W2 are hereinafter referred to as overall image-shooting ranges W1 and W2.

The following formulae (3) and (4) are satisfied, where Rv indicates a common visual field rate, and the common visual field rate Rv is obtained by normalizing V (this can be multiplied by 100 for expression in percentage) using W.

$$Rv = V/W = 1 - B/W = 1 - B \cdot F/(D \cdot X0) \quad \text{Formula (3)}$$

$$\varphi = 2 \cdot \arctan[X0/(2 \cdot F) - B/(2 \cdot D)] \quad \text{Formula (4)}$$

As described above, F in formulae (1)-(4) indicates the image-plane distance of the fixed focusing system. As is well known, a focal distance is defined as an imaging distance specific to a subject at infinite distance. Hence, for subjects at infinite distance, the image-plane distance F is equal to the focal distance. For subjects at finite distance, the image-plane distance F is equal to the focal distance plus a predetermined amount of image plane movement caused by focusing. Accordingly, in a system with a focus adjustment function, the image-plane distance F is usually a function of a subject distance. In a fixed focusing system, the image-plane distance F does not depend on a subject distance but is a constant.

As described above, the common visual field range V is changed in accordance with the subject distance D. As depicted in FIG. 3, the overall image-shooting range W2 specific to a long distance (D2) is wider than the overall image-shooting range W1 specific to a short distance (D1); the proportion of the common visual-field range specific to a long distance that is taken up in the visual field of one imaging unit is higher than the proportion of the common visual-field range specific to a short distance that is taken up in the visual field of the one imaging unit, and hence, in the case of a long distance, three-dimensional image shooting can be performed for a wider region. In image shooting of reinforcing bars at a building site, an image of plurality of reinforcing bars, not a single bar, is typically captured in order to improve the efficiency of image shooting. Hence, the image shooting is performed typically under a subject distance that is equal to or longer than a predetermined distance.

Figure 4:
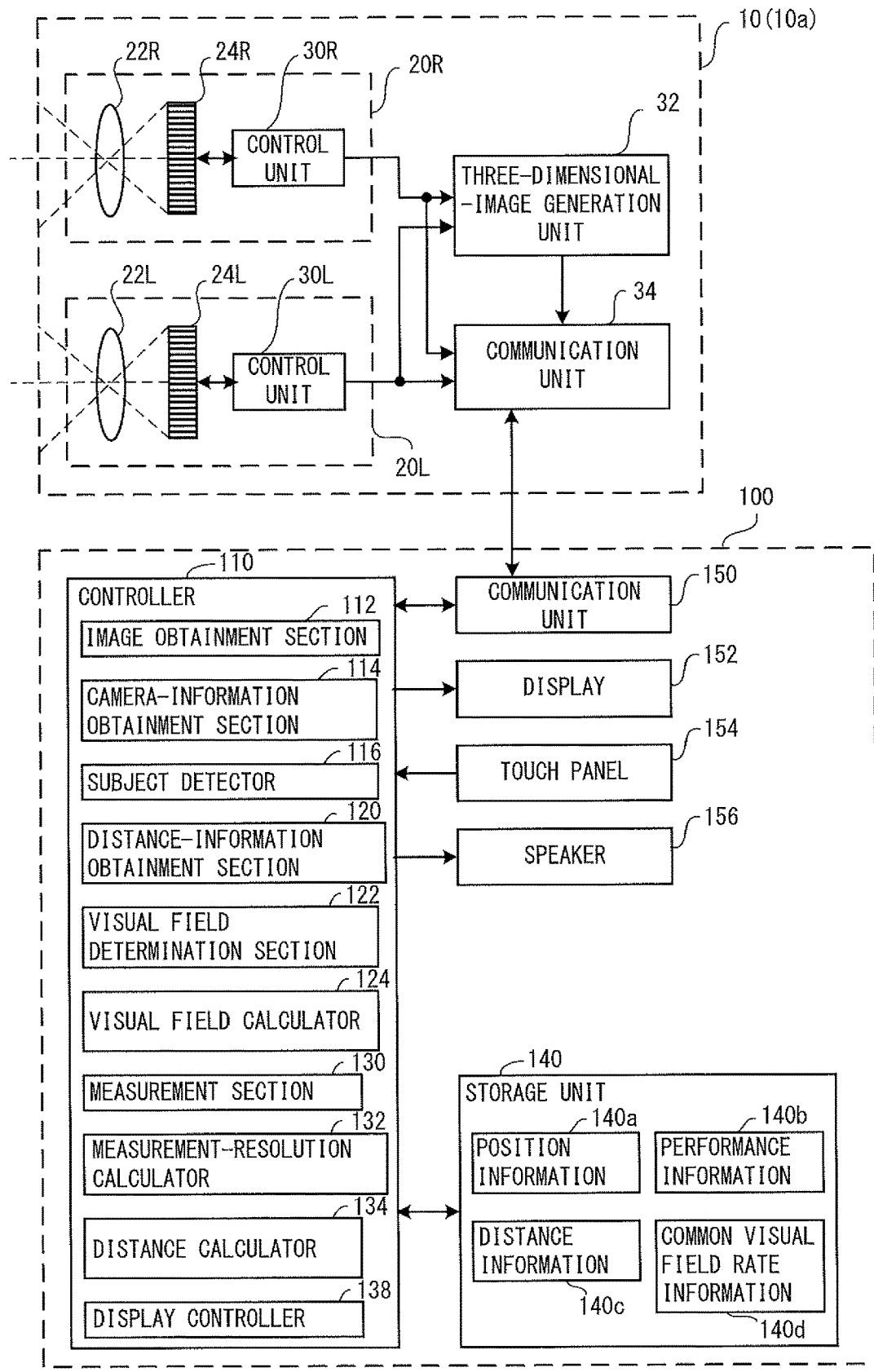
FIG. 4 is a functional block diagram of a camera and an information processing apparatus.

FIG. 4 is a functional block diagram of a camera 10 and an information processing apparatus 100. The stereo camera 10a will be referred to as a camera 10 in the following description. The camera 10 includes a right imaging unit 20R that shoots a right viewpoint image, a left imaging unit 20L that shoots a left viewpoint image, a three-dimensional-image generation unit 32, and a communication unit 34.

The right imaging unit 20R includes a lens 22R, an image sensor 24R, and a control unit 30R. The lens 22R forms a subject image on the image sensor 24R. The image sensor 24R performs photoelectric conversion of the subject image. The control unit 30R controls operations of the entirety of the right imaging unit 20R and coverts a signal output from the image sensor 24R into image data. The left imaging unit 20L includes a lens 22L, an image sensor 24L, and a control unit 30L. The configuration of the left imaging unit 20L is similar to that of the right imaging unit 20R, and descriptions thereof are omitted herein.

The three-dimensional-image generation unit 32 generates a three-dimensional image by synthesizing image data from the right imaging unit 20R and the left imaging unit 20L. The communication unit 34 transmits/receives data to/from an external device wirelessly or by a wired link. The communication unit 34 receives an image-shooting instruction from the information processing apparatus 100. The communication unit 34 also outputs image data from the right imaging unit 20R (hereinafter referred to as a right image), image data from the left imaging unit 20L (hereinafter referred to as a left image), and a three-dimensional image to the information processing apparatus 100. In addition, at a request from the information processing apparatus 100, the communication unit 34 transmits performance information and position information of the camera 10 or distance information for image shooting to the information processing apparatus 100.

The information processing apparatus 100 includes a controller 110, a storage unit 140, a communication unit 150, and a display 152, a touch panel 154, and a speaker 156. The controller 110 comprehensively controls the entirety of the information processing apparatus 100. The controller 110 performs various types of processing through software processing performed by a CPU into which a control program has been loaded.

The controller 110 includes an image obtainment section 112, a camera-information obtainment section 114, a subject detector 116, a distance-information obtainment section 120, a visual field determination section 122, a visual field calculator 124, a measurement section 130, a measurement-resolution calculator 132, a distance calculator 134, and a display controller 138.

The image obtainment section 112 obtains a right image, a left image, and a three-dimensional image transmitted from the camera 10 via the communication unit 150. The camera-information obtainment section 114 requests various types of information from the camera 10 and obtains the information transmitted from the camera 10. The various types of information include position information 140a and performance information 140b, which will be described hereinafter. The camera-information obtainment section 114 may obtain, from the camera 10, image-shooting distance information detected by the camera 10.

The subject detector 116 detects a subject designated in advance from an image obtained by the image obtainment section 112. In this example, a reinforcing bar is registered as a subject in advance, and image information of the reinforcing bar is stored in the storage unit 140. The subject detector 116 refers to the image information of the reinforcing bar and detects the reinforcing bar from the obtained image through, for example, pattern matching.

The distance-information obtainment section 120 obtains a distance D to a subject from a phase difference between a right image and a left image. In particular, the distance-information obtainment section 120 identifies, for each of the right and left images, the position on a screen at which the subject detected by the subject detector 116 is located. Then, the distance-information obtainment section 120 obtains the subject distance D using the difference between the respective positions identified for the right and left images. The distance-information obtainment section 120 may use, as the subject distance D, the above-described image-shooting distance information obtained from the camera 10.

The visual field determination section 122 determines a common visual field range V of a right image and a left image for the subject distance D. The visual field determination section 122 determines the common visual field range V using formula (2) on the basis of the subject distance D obtained by the distance-information obtainment section 120 and a specification of the imaging unit 20 (position information 140a, performance information 140b).

The visual field calculator 124 calculates, as a common visual field rate Rv, the ratio between an overall image-shooting range W specific to the subject distance D obtained by the distance-information obtainment section 120 and the common visual field range V determined by the visual field determination section 122. The visual field calculator 124 calculates the common visual field rate Rv using formula (3). The visual field calculator 124 may issue an alarm upon determining that the common visual field rate Rv has become a predetermined rate or lower (e.g., a required value P or less, which will be described hereinafter). The alarm issued by the visual field calculator 124 may be at least one of an alarm displayed on the screen of the display 152 or a sound alarm provided by the speaker 156.

The measurement section 130 measures the diameter of reinforcing bars and the intervals between the reinforcing bars using a shot image and outputs the measured values. The measurement-resolution calculator 132 calculates a measurement resolution for the measurement section 130 using a subject distance D.

Formula (5) is satisfied, where Ro indicates the measurement resolution, ri indicates a resolution on the image sensor 24, and D indicates the subject distance.

$$Ro = D \times ri/F \qquad \text{Formula (5)}$$

ri, i.e., the resolution on the image sensor 24, may be varied depending on a principle or scheme for the measurement. However, the resolution ri may also be determined through theoretical calculations or experimental evaluations, including simulations, and the resolution in this example is one obtained in such a way.

The relationship between the measurement resolution (measuring accuracy) Ro and the subject distance D that is established on the subject plane can be determined using formula (5). In particular, as D becomes smaller, i.e., as the distance to the subject becomes shorter, the measuring accuracy becomes higher (measurement resolution Ro becomes smaller). $Q \geq Ro$ needs to be satisfied to obtain a reliable result of the measurement, where Q indicates a required accuracy (necessary resolution) for the measurement, and this condition may be applied to formula (5), thereby providing formula (6).

$$D \leq F \times Q/ri \qquad \text{Formula (6)}$$

The measurement-resolution calculator 132 calculates Dq, a maximum distance that satisfies a required accuracy Q for a measurement resolution. A photographer sets and inputs the required accuracy Q, e.g., 2 mm. Increasing the subject distance D widens the image-shooting range, and this allows a plurality of members to be simultaneously photographed, but decreases the measuring accuracy. Hence, when a high measuring accuracy is required, an image needs to be shot at a position close to the subject. The required value P for the common visual field rate Rv and the required accuracy Q for the measurement contradict with the subject distance D.

The distance calculator 134 calculates a corresponding distance Dp from the required value P for the common visual field rate Rv. The required value P for the common visual field rate Rv is input by the photographer and is, for example, 80%. Using formula (3), the distance calculator 134 calculates a distance Dp that corresponds to the required value P for the common visual field rate Rv.

In addition, the distance calculator 134 calculates, on the basis of the distance Dp that corresponds to the required value P for the common visual field rate Rv and a distance Dq that corresponds to the required accuracy Q for the measurement, a recommended distance Dr that satisfies both the common visual field and the measuring accuracy. For example, when Dp<Dq, the distance calculator 134 may calculate a position intermediate between the distance Dp and the distance Dq ((Dp+Dq)/2) as the recommended distance Dr.

The display controller 138 displays, on the display 152, a shot image and a guide screen that indicates a subject distance suitable for the photographer. The common visual field rate Rt, the required value P, and the required accuracy Q are displayed on the guide screen together with a live view image.

The storage unit 140 stores a control program and various types of data. The storage unit 140 also stores position information 140a, performance information 140b, distance information 140c, and common visual field rate information 140d.

Position information 140a is coordinate information indicating the relative positions of the right imaging unit 20R and the left imaging unit 20L. However, when each imaging unit is set on a single tripod or the like, the right imaging unit 20R and the left imaging unit 20L may be considered to have no differences in height direction or subject direction. In this case, position information 140a only includes one-dimensional distance information of the right imaging unit 20R and the left imaging unit 20L (the difference in width direction, i.e., base line length B). As a result, the amount of information to be input is decreased. Position information 140a is required to calculate the common visual field rate Rv.

Performance information 140b is information on a performance related to optical characteristics of the right imaging unit 20R and the left imaging unit 20L, and is necessary to calculate a common visual field rate Rv after, for example, an angle of view $\varphi$ and a focal distance are calculated for each of the imaging units 20.

Distance information 140c is information on a subject distance D obtained by the distance-information obtainment section 120. Common visual field rate information 140d relates to a common visual field rate Rv calculated by the visual field calculator 124.

The communication unit 150 transmits/receives data to/from an external device wirelessly or by a wired link. The display 152, which is, for example, an LCD, displays a shot image and/or a guide screen under control of the display controller 138. The touch panel 154 is an operating unit integral with the display 152, and various instructions from the photographer are input therethrough. The speaker 156 outputs sounds such as alarm sounds under the control of the controller 110.

Figure 5:
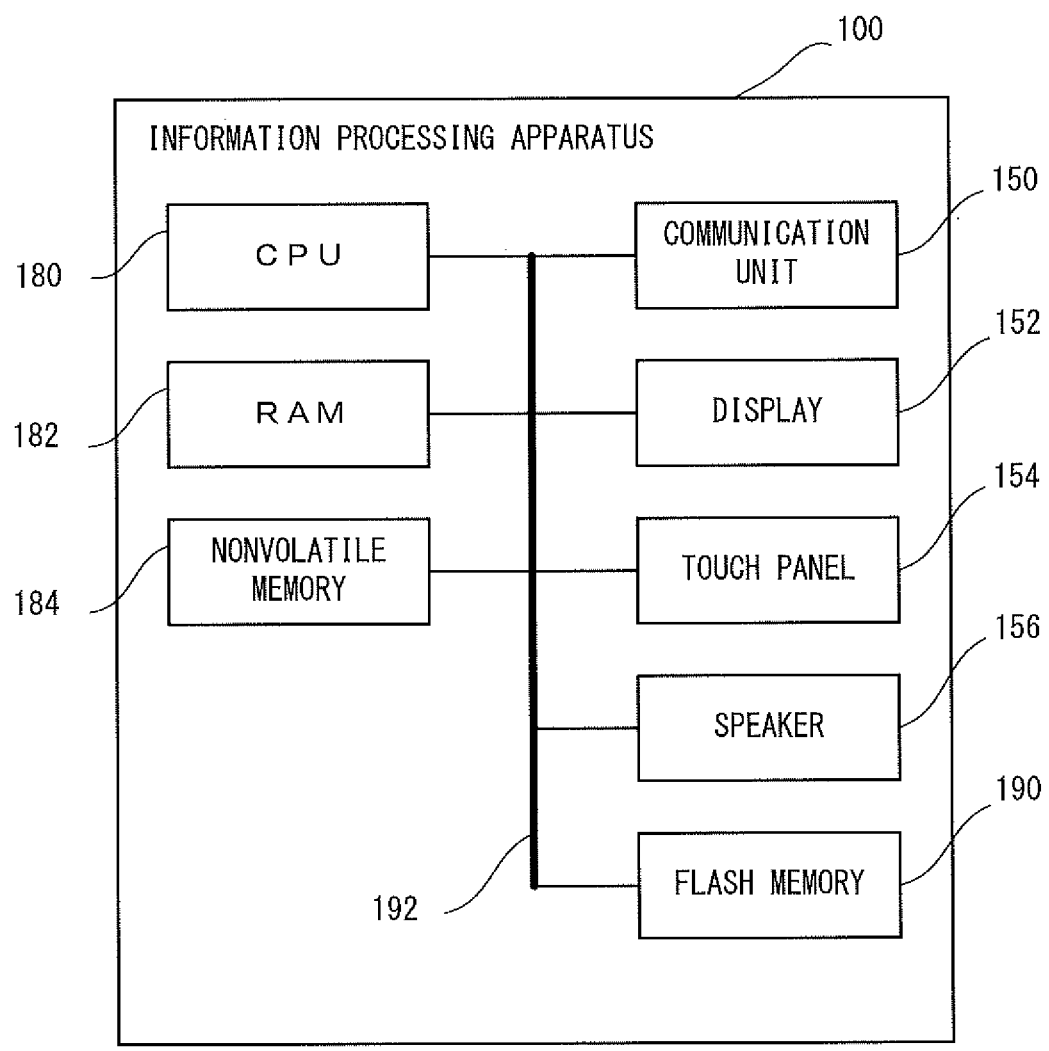
FIG. 5 is a hardware block diagram of an information processing apparatus.

FIG. 5 is an exemplary hardware block diagram of the information processing apparatus 100. The information processing apparatus 100 includes a CPU (Central Processing Unit) 180, a RAM (Random Access Memory) 182, a nonvolatile memory 184, a communication unit 150, a display 152, a touch panel 154, a speaker 156, and a flash memory 190.

The CPU 180 reads and executes a control program stored in the nonvolatile memory 184 so as to control the information processing apparatus 100 through software processing. The RAM 182 provides a working area in which a control program and various types of data are temporarily stored. The RAM 182 is, for example, a DRAM (Dynamic Random Access Memory).

The nonvolatile memory 184 stores a control program and various data tables in a nonvolatile manner. The nonvolatile memory 184 is a flash memory or an HDD (Hard Disk Drive). The storage unit 140 comprises the nonvolatile memory 184. The controller 110 comprises the CPU 180, the RAM 182, and the nonvolatile memory 184.

The flash memory 190 stores a shot image and various types of data. The communication unit 150, the display 152, the touch panel 154, and the speaker 156 have already been described hereinabove. The CPU 180 is coupled to the RAM 182 via a bus 192.

Figure 6:
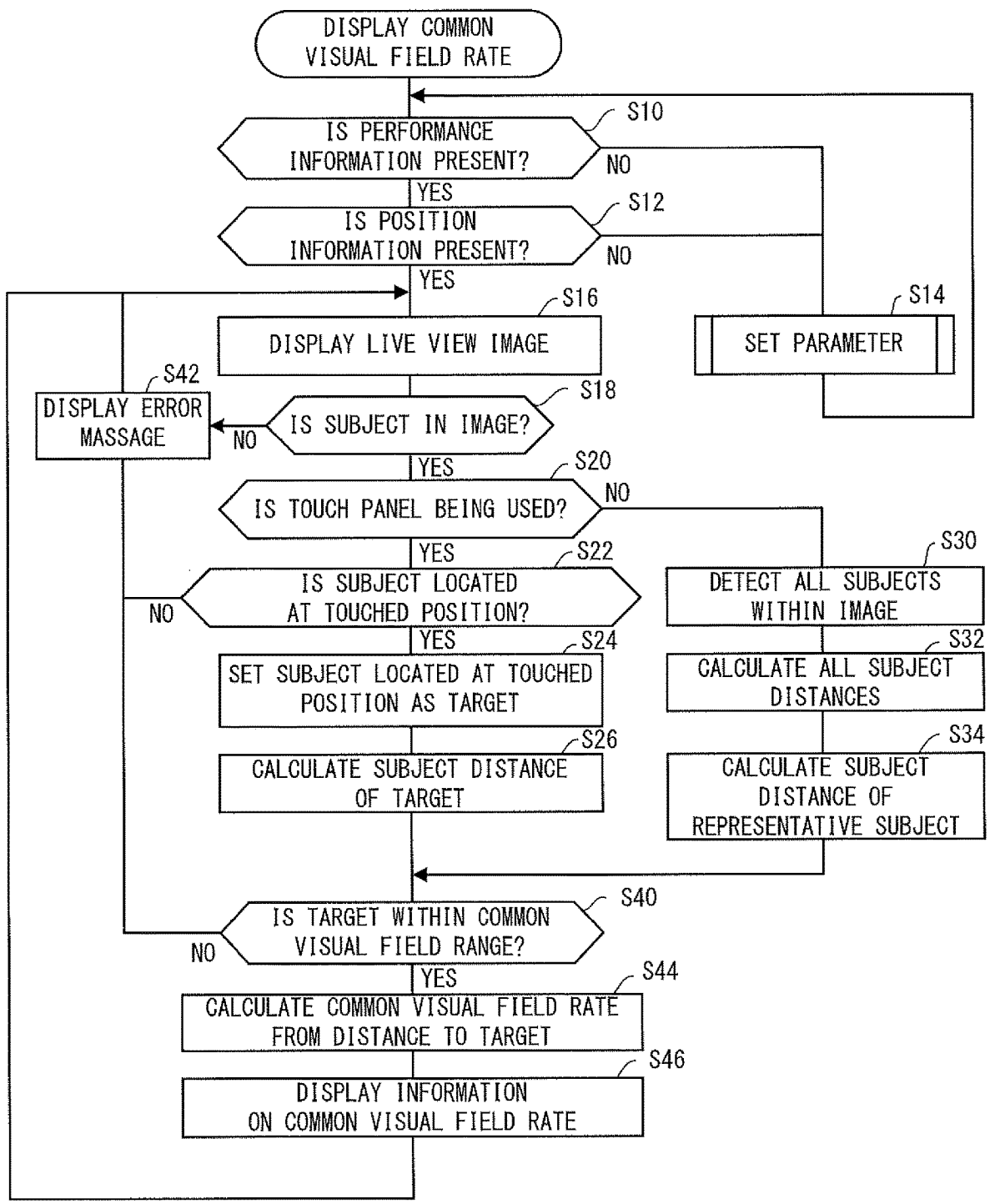
FIG. 6 is a flowchart illustrating a procedure for a process of displaying a guide screen.

FIG. 6 is a flowchart illustrating a procedure for a process of displaying a guide screen. The guide screen guides the photographer for a suitable position for image shooting. The processing described in the following is executed mainly by the controller 110.

The visual field determination section 122 determines whether performance information 140b is stored in the storage unit 140 (step S10). As described above, performance information 140b is information on a performance related to optical characteristics of the imaging unit 20. When the visual field determination section 122 has determined that performance information 140b is not stored in the storage unit 140 (NO in step S10), the visual field determination section 122 shifts to step S14.

When the visual field determination section 122 has determined that performance information 140b is stored in the storage unit 140 (YES in step S10), the visual field determination section 122 determines whether position information 140a is stored in the storage unit 140 (step S12). As described above, position information 140a is three-dimensional coordinate information indicating the relative positions of the plurality of imaging units 20.

When the visual field determination section 122 has determined that position information 140a is not stored in the storage unit 140 (NO in step S12), the visual field determination section 122 shifts to step S14. When parameters such as performance information 140b and position information 140a are not stored in the storage unit 140, the display controller 138 may display a notice such as "Performance information (or position information) has not been input" on the display 152. Subsequently, the flow shifts to parameter setting that will be described hereinafter with reference to FIG. 7.

Figure 7:
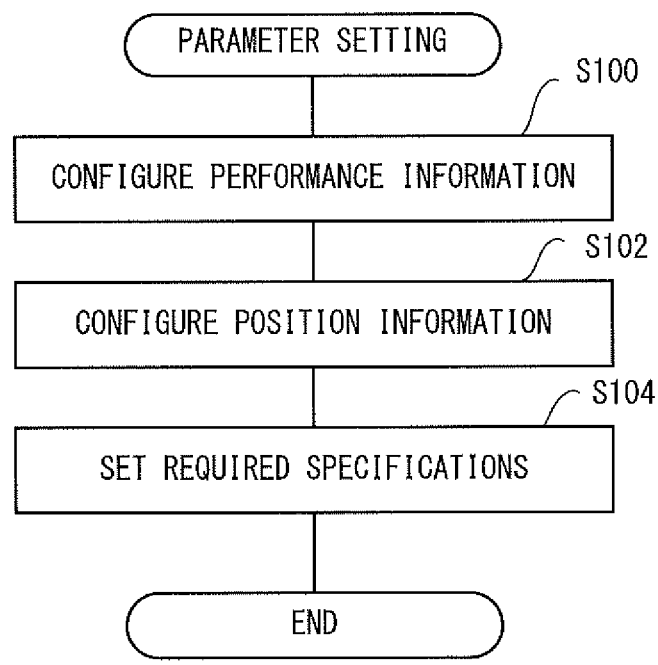
FIG. 7 illustrates a subroutine indicating a procedure for a process of parameter setting.

FIG. 7 illustrates a subroutine indicating a procedure for a process for parameter setting of step S14. The camera-information obtainment section 114 obtains information on performances required to calculate a common visual field rate Rv (hereinafter referred to as performance information), such as the angle of view and the focal distance of each imaging unit 20, by requesting the performance information from the camera 10. The camera-information obtainment section 114 configures performance information 140b based on the performance information that has been obtained from the camera 10 (step S100) and stores the configured information in the storage unit 140.

In the meantime, a data table (not illustrated) that has the performance information of the camera 10 recorded therein may be stored in the storage unit 140 in advance, so that the camera-information obtainment section 114 can read the performance information from the data table. When, for example, the model number and performance information of the camera 10 have been registered in the data table, the camera-information obtainment section 114 may read corresponding performance information from the data table on the basis of a model number input for the camera 10. The camera-information obtainment section 114 may obtain performance information of the camera 10 transmitted from the server 5 over the Internet.

When the camera 10 is the stereo camera 10a, the camera-information obtainment section 114 obtains a base line length B from the camera 10 so as to configure position information 140a (step S102) and stores the position information 140a in the storage unit 140. When the camera 10 is two monocular cameras 10b, the camera-information obtainment section 114 may cause the photographer to input three-dimensional-coordinate information that indicates where in the space the plurality of imaging units 20 are located. In this case, when the two monocular cameras 10b are mounted on a single tripod, only the base line length B of the two monocular cameras 10b needs to be input on the assumption that deviation in the height direction or the subject direction is not present.

In response to input from the photographer, the controller 110 sets required specifications (step S104). The required specifications are, in particular, a required value P for a common visual field rate Rv and a required accuracy Q for a measurement resolution. The controller 110 stores in the storage unit 140 a required value P and required accuracy Q input by the photographer using the touch panel 154. It is troublesome for the photographer to set these required specifications, and hence typical initial values may be stored in the storage unit 140 as a table, and changes may be made to those values. Default values may be set when a required value P or a required accuracy Q is not input. After step S104, the flow returns to step S10.

Next, descriptions will be given by referring to FIG. 6 again. When the visual field determination section 122 has determined that position information 140a is stored in the storage unit 140 (YES in step S12), the visual field determination section 122 shifts to step S16. The image obtainment section 112 obtains a shot live view image from the camera 10. The display controller 138 displays the obtained live view image on the display 152 (step S16). The displayed live view image may be an image captured by one of the right and left imaging units 20 or may be a three-dimensional image that has been generated. Alternatively, right and left images may be arranged in parallel to each other to be displayed as live view images.

The subject detector 116 detects whether a subject is in the live view image (step S18). In this example, the subject is a reinforcing bar. When the subject detector 116 does not detect a subject in the live view image (NO in step S18), the display controller 138 gives notice to the photographer by displaying an error message or guide message such as "No subjects are present" or "Point camera at subject" (step S42). The controller 110 may issue a sound alarm from the speaker 156 simultaneously with displaying the error message. After step S42, the flow returns to step S16.

When the subject detector 116 has detected a subject in a currently displayed live view image (YES in step S18), the controller 110 determines whether the photographer is performing a touch operation on the touch panel 154 (step S20).

When the controller 110 has determined that the photographer is performing a touch operation on the touch panel 154 (YES in step S20), the controller 110 determines whether a subject (corresponding to a reinforcing bar in this example) is located at a position touched by the photographer (step S22). That is, the controller 110 determines whether the position touched by the photographer is included in the position of the subject detected by the subject detector 116.

When the controller 110 has determined that a subject is not located at the position touched by the photographer (NO in step S22), the display controller 138 displays an error message (step S42). For example, the display controller 138 may display on the display 152 an error message such as "No subjects are present at touched portion", "Subject is not being touched", or "Display is being erroneously touched (report of unintentional touch)". In this situation, since the subject detector 116 has detected the subject, the display controller 138 may display a message to enable the photographer to correctly identify the subject. For example, the display controller 138 may highlight (blink) the outline of the detected subject.

When the controller 110 has determined that a subject is present at the position touched by the photographer (YES in step S22), the controller 110 sets the subject located at the touched position as a target (step S24). In particular, even when a plurality of reinforcing bars are displayed on the screen, only a reinforcing bar selected by the photographer is set as a target. The distance-information obtainment section 120 calculates a distance to the subject set as the target (subject distance D) (step S26). For example, the distance-information obtainment section 120 may calculate the subject distance D on the basis of a phase difference between right and left images.

The flow returns to step S20. When the controller 110 has determined that the photographer is not performing a touch operation on the touch panel 154 (NO in step S20), the subject detector 116 sets an automatic detection mode to detect all subjects within the image (step S30). That is, all reinforcing bars on the screen are detected. For each of the detected subjects, the distance-information obtainment section 120 calculates a subject distance D (step S32).

The distance-information obtainment section 120 compares the plurality of calculated subject distances D and chooses a subject that satisfies a predetermined condition as a representative subject. The distance-information obtainment section 120 sets a distance to the representative subject as a subject distance D (step S34). The representative subject is, for example, a subject that is the closest to the imaging unit 20 (nearest subject). When, for example, another subject has a salient feature (e.g., when a reinforcing bar is marked), the distance-information obtainment section 120 may set that subject, not the nearest subject, as a representative subject by detecting that feature.

In the example described above, a representative subject is chosen; however, a tangible subject does not necessarily need to be present. In particular, in step S34, a distance that is a representative of a plurality of subject distances (e.g., a distance such that a tangible subject is present within a depth of field) may be set as a subject distance D. The controller 110 sets the representative subject as a target.

The visual field determination section 122 determines whether the target is within a common visual field range V (step S40). When the visual field determination section 122 has determined that the target is not within the common visual field range V (NO in step S40), the display controller 138 displays an error message such as "Position of target is unsuitable for three-dimensional measurement", "Keep longer distance from target", or "Turn target to center of screen" (step S42), and the flow returns to step S16. An alarm sound may be produced simultaneously with the error message.

When the visual field determination section 122 has determined that the target is within the common visual field range V (YES in step S40), the visual field calculator 124 calculates a common visual field rate Rv from the subject distance D of the target (step S44). The display controller 138 displays information on the calculated common visual field rate Rv on the guide screen (step S46). When the common visual field rate Rv is equal to or less than a predetermined rate, the display controller 138 may display an error message, and the controller 110 may issue an error alarm.

Figure 8A:
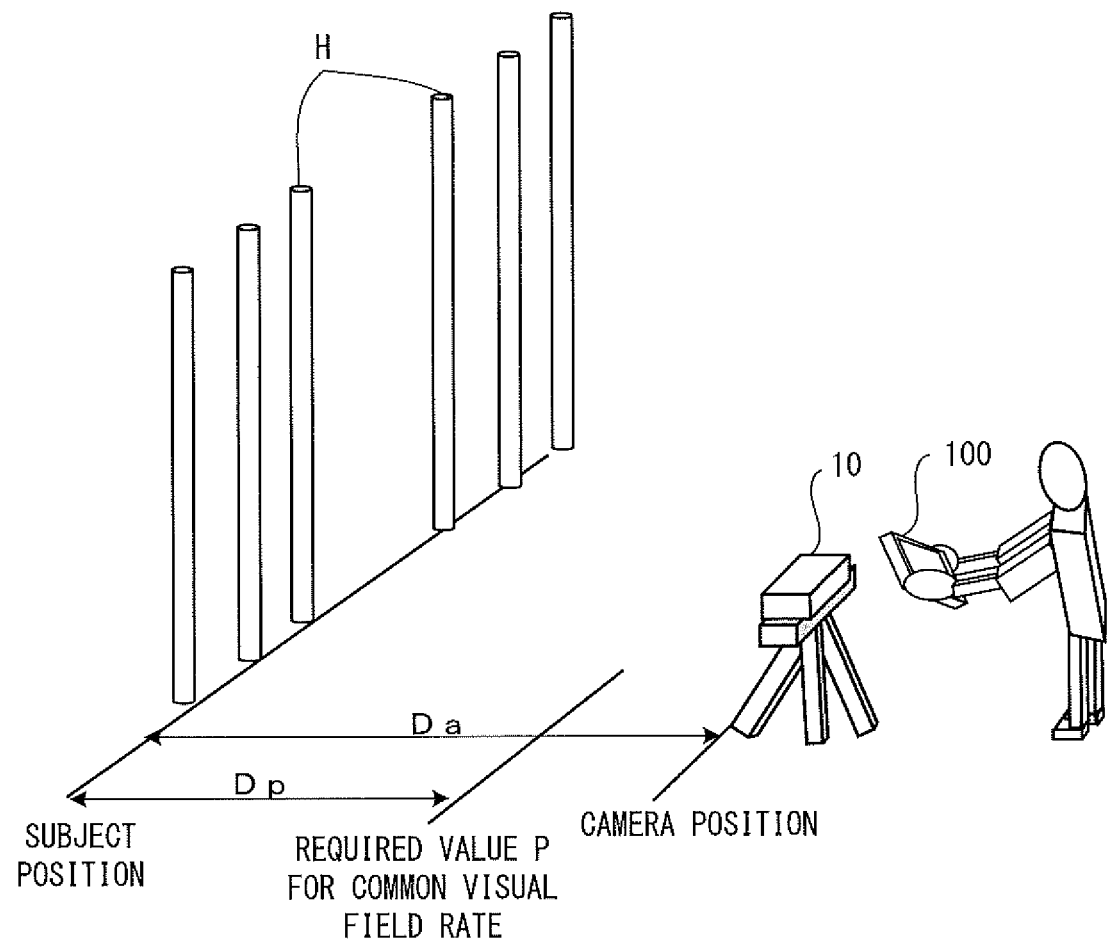
FIG. 8A illustrates a relationship between a subject distance and a required value for a common visual field rate.
Figure 8B:
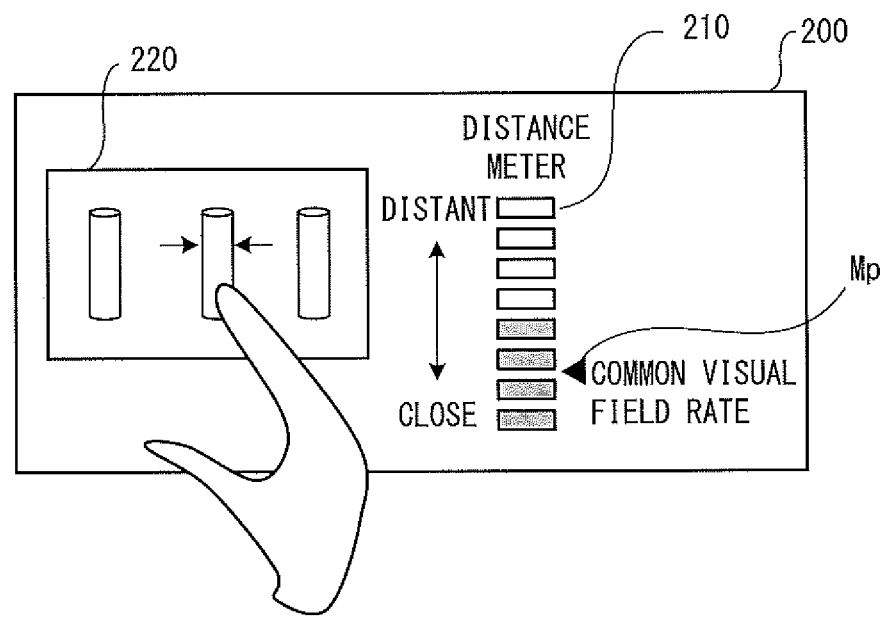
FIG. 8B illustrates a first guide screen.
Figure 8C:
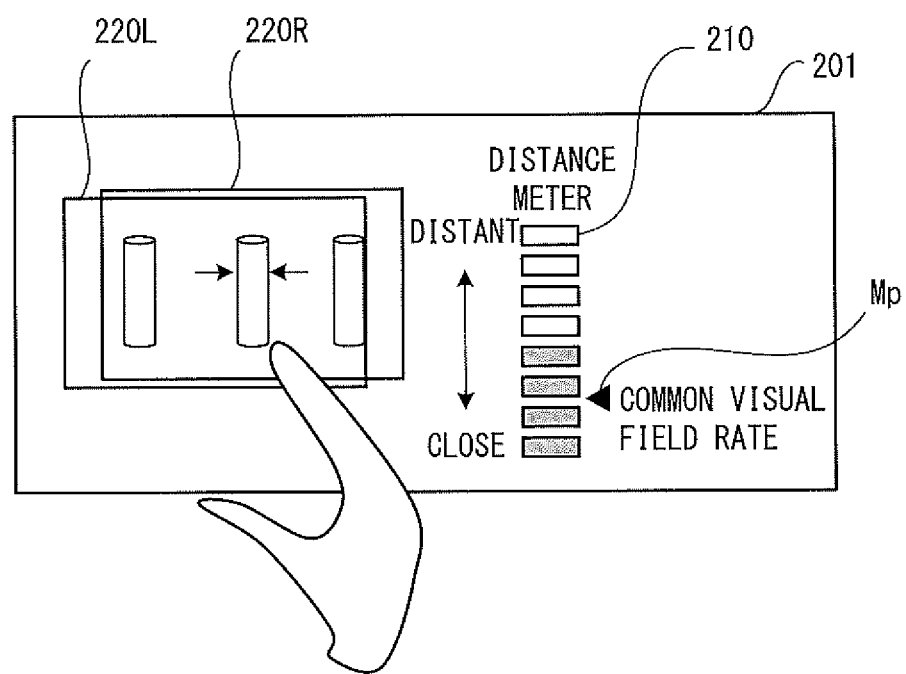
FIG. 8C illustrates a variation of a first guide screen.
Figure 10:
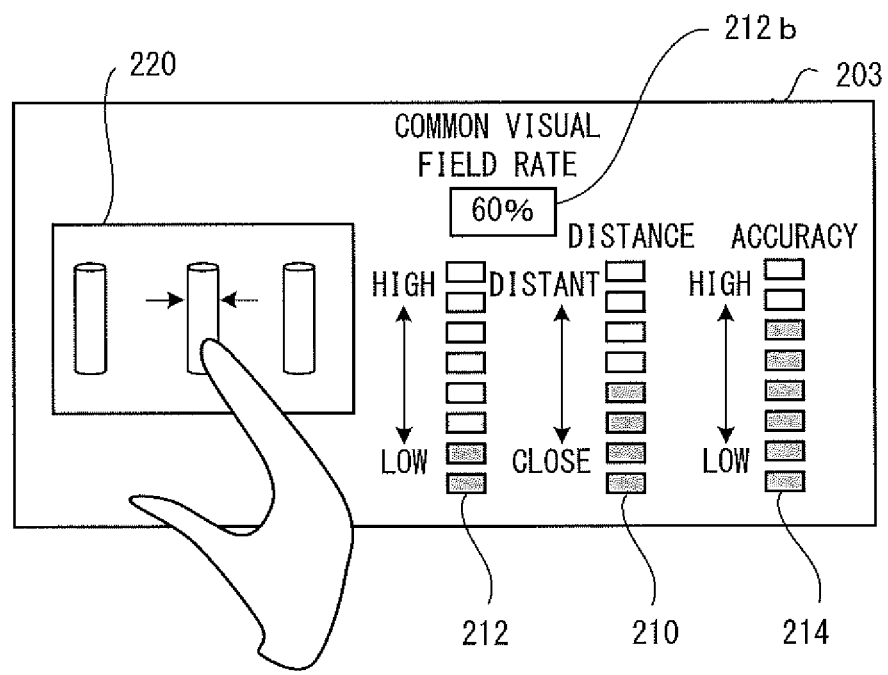
FIG. 10 illustrates a third guide screen.

By referring to FIGS. 8-10, the following describes exemplary guide screens on which information on common visual field rate Rv is displayed. FIGS. 8A, 8B, and 8C illustrate examples in which a calculated common visual field rate Rv is displayed on a distance meter. As indicated by formula (3), common visual field rate Rv is determined only by a subject distance D when the values of the camera 10 (e.g., base line length B, horizontal length) are fixed. A longer subject distance D results in a higher common visual field rate Rv. In consideration of the photographer's sense, subject distance D would be a more easily perceivable parameter for the photographer than common visual field rate Rv. Accordingly, a distance meter that indicates a current subject distance D is displayed on the guide screen, and a distance that corresponds to a required value P for common visual field rate Rv is displayed on the distance meter.

FIG. 8A depicts image shooting with a reinforcing bar H as a subject. Da indicates a subject distance from the camera 10 to the reinforcing bar H. Dp indicates a distance that corresponds to a required value P for a common visual field rate Rv. That is, the required value P is satisfied when the length between the subject and the position at which the photographer is located when shooting an image of the subject is longer than Dp.

FIG. 8B depicts a first guide screen 200 displayed on the display 152. A live view image 220 is displayed at the left-hand side of the first guide screen 200. Three reinforcing bars H are displayed on the live view image 220. The live view image 220 may be displayed on the right-hand side or left-hand side of the first guide screen 200.

A distance meter 210 is displayed at the right-hand side of the first guide screen 200. The distance meter 210 displays a current subject distance Da. In the distance meter 210, the subject distance Da is displayed by raising or lowering a gray portion. Moving the camera 10 away from the reinforcing bar H increases the subject distance Da, thereby raising the gray portion. Moving the camera 10 closer to the reinforcing bar H decreases the subject distance Da, thereby lowering the gray portion.

A marker Mp indicates a distance that corresponds to a required value P for a common visual field rate Rv and is displayed at a corresponding position on the distance meter 210. Hence, the photographer may determine a position for the camera 10 such that the gray portion is above the marker Mp in the distance meter 210. In the example of FIG. 8B, the current subject distance Da is at a position that exceeds the marker Mp, and hence the current image-shooting position satisfies the required value P. The first guide screen 200 enables a distance that satisfies a required value for the common visual field rate Rv to be intuitively identified. Displaying the distance-based meter allows the photographer to easily make on-site determinations.

FIG. 8C illustrates a variation of the first guide screen 200. A first guide screen 201 depicted in FIG. 8C is an exemplary screen on which a left live view image 220L and a right live view image 220R overlaid on each other are displayed. Instead of displaying both of the live view images, the image frame of one of the live view images may be overlaid on the other image in a manner such that only the image frame and the other image are displayed. Identifying the position of the image frame allows the range of superimposition of the right and left images to be visually determined. That is, a guide screen 201 such as that depicted in FIG. 8C allows a manner to be intuitively grasped in which the right and left images are superimposed. As a result, in the designating of a target subject described above with reference to step S20, a subject that is not located within the common visual field portion can be easily prevented from being designated. This improves the operability.

FIGS. 9A and 9B depict examples for a guide screen with a required accuracy Q for measurement resolution added to the required value P for common visual field rate Rv. Not only ensuring a common visual field rate Rv but also ensuring an accuracy in measurement is important for three-dimensional measurement. This is because an accuracy in detection of a target subject that the photographer wishes to have would not be achieved due to a decrease in the measurement resolution that could be caused when the distance between the camera 10 and the subject increases, as described above with reference to, for example, formulae (5) and (6).

FIG. 9A depicts image shooting with a reinforcing bars H as subjects. Da indicates a current subject distance from the camera 10 to a reinforcing bar H; Dp, a distance that corresponds to a required value P for a common visual field rate Rv; Dq, a distance that corresponds to a required accuracy Q. Dr indicates a recommended distance that satisfies both the required value P for the common visual field rate Rv and the required accuracy Q. The recommended distance is, for example, a value intermediate between Dp and Dq.

FIG. 9B depicts a second guide screen 202 displayed on the display 152. As in FIG. 8B, a live view image 220 and a distance meter 210 are displayed on the second guide screen 202. A marker Mp that indicates a position depending on a distance that corresponds to a required value P for common visual field rate Rv, a marker Mq that indicates a position depending on a distance that corresponds to a required accuracy Q, and a marker Mr that indicates a position that corresponds to a recommended distance are displayed to the right of the distance meter 210.

The photographer may easily perform three-dimensional image shooting that satisfies both the required value P for common visual field rate Rv and the required accuracy Q by adjusting the image shooting position using the guide screen 202 in a manner such that the gray portion of the distance meter 210 approaches the marker Mr.

FIG. 10 depicts a third guide screen 203 displayed on the display 152. In addition to the distance meter 210, the third guide screen 203 displays a common-visual-field-rate meter 212, a common visual field rate 212b, and an accuracy meter 214. A current common visual field rate Rv is displayed by both the common-visual-field-rate meter 212 and the common visual field rate 212b. The current common visual field rate is displayed directly as a value by the common visual field rate 212b. Distancing the camera 10 from the subject increases the common visual field rate Rv, thereby raising the gray portion of the common-visual-field-rate meter 212.

Distancing the camera 10 from the subject raises the gray portion of the distance meter 210, as in the example of FIG. 9B. The accuracy meter 214 indicates the level of the measuring accuracy. A higher position on the accuracy meter 214 indicates a higher measuring accuracy. In particular, decreasing the subject distance Da by moving the camera 10 closer to the subject increases the measuring accuracy, thereby raising the gray portion. As in the example of FIG. 9B, the marker Mp and the marker Mq may be displayed next to the common-visual-field-rate meter 212 or the accuracy meter 214 on the third guide screen 203.

The second guide screen 202 and the third guide screen 203 have been described under Dp<Dq, but Dp>Dq may be satisfied. When Dp>Dq, there are no subject distances that satisfy both the required value P for common visual field rate Rv and the required accuracy Q. In this case, the controller 110 may give notice to the photographer by displaying an error message or issuing an error alarm.

In image shooting of reinforcing bars at a building site, an image of plurality of reinforcing bars, not a single bar, is typically captured in order to improve the efficiency of image shooting. In three-dimensional image shooting of reinforcing bars, an image needs to be shot with a plurality of reinforcing bars located within a common visual field. However, in using a camera designed for three-dimensional image shooting, the range of a common visual field cannot be easily identified, unlike in the case of a monocular camera. To enable three-dimensional image shooting to be readily performed at, for example, a construction site, a common visual field needs to be easily identified. The embodiment may provide an information processing apparatus that allows a common visual field to be easily identified in three-dimensional image shooting.

Accordingly, in the embodiment, a guide screen for giving guidance to satisfy a predetermined common visual field rate is displayed so that proper three-dimensional image shooting can be easily performed. A guide screen for giving guidance to satisfy a common visual field rate and a predetermined measuring accuracy is also displayed so that three-dimensional image shooting for measurement can be easily performed.

Two imaging units 20 are arranged in a horizontal direction as cameras for three-dimensional image shooting in the described examples, but they may be arranged in a vertical direction. According to the descriptions above, the functions of the controller 110 are implemented by software processing; however, some of, or all of, the functions may be implemented by hardware such as a gate array.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS

1: Three-dimensional image shooting system
10: Camera
20R: Right imaging unit
20L: Left imaging unit
22R, 22L: Lens
24R, 24L: Image sensor
30R, 30L: Control unit
32: Three-dimensional-image generation unit
34: Communication unit
100: Information processing apparatus
110: Controller
112: Image obtainment section
114: Camera-information obtainment section
116: Subject detector
120: Distance-information obtainment section
122: Visual field determination section
124: Visual field calculator
130: Measurement section
132: Measurement-resolution calculator
134: Distance calculator
138: Display controller
140: Storage unit
140a: Position information
140b: Performance information
140c: Distance information
140d: Common visual field rate information
150: Communication unit
152: Display
154: Touch panel
156: Speaker

What is claimed is:

1. An information processing apparatus comprising:
a controller CPU which executes a control program to
determine, for a predetermined subject distance and on the basis of two images with different parallaxes that have been captured by a plurality of imaging units that perform three-dimensional image shooting, a common visual field range of the two images with different parallaxes, and
calculate, as a common visual field rate, a ratio between an overall visual field range of one of the plurality of imaging units that is specific to the predetermined subject distance and the determined common visual field range; and
a display controller that displays, on a display, the common visual field rate as information on the determined common visual field range.

2. The information processing apparatus according to claim 1, wherein the controller CPU further obtains a subject distance, and
calculates a subject distance that corresponds to a required value for the common visual field rate, and wherein
the display controller displays, on an axis indicative of a subject distance level, the subject distance obtained and the subject distance corresponding to the required value that has been calculated.

3. The information processing apparatus according to claim 2, wherein the controller CPU further calculates a subject distance that corresponds to a required accuracy that has been set for an accuracy in a measurement resolution for performing measurement based on an image, and wherein
the display controller displays, on the axis indicative of a subject distance level, the subject distance that corresponds to the required value and the subject distance that corresponds to the required accuracy.

4. The information processing apparatus according to claim 3, wherein
the display controller displays information on a recommended distance that satisfies both a required value set for the common visual field rate and a recommended accuracy set for the accuracy in the measurement resolution.

5. The information processing apparatus according to claim 1, wherein the controller CPU further obtains a subject distance that is a distance from the plurality of imaging units to a representative subject that corresponds to a predetermined condition, and
determines the common visual field range on the basis of the subject distance that is a distance to the representative subject.

6. The information processing apparatus according to claim 5, wherein
the representative subject is a subject that is the closest to the plurality of imaging units.

7. The information processing apparatus according to claim 1, further comprising:
a touch panel provided at the display,
wherein the controller CPU further obtains a subject distance, and obtains a distance to a subject designated using the touch panel from among subjects displayed on the display.

8. The information processing apparatus according to claim 1, wherein
the display controller displays the common visual field rate in a meter format.

9. The information processing apparatus according to claim 1, wherein
the CPU controller further issues an alarm when the common visual field rate is determined to be equal to or less than a predetermined rate.

10. The information processing apparatus according to claim 9, wherein
the CPU controller issues, as the alarm, at least one of an alarm displayed on a screen of the display or a sound alarm.

11. The information processing apparatus according to claim 1, wherein
the plurality of imaging units are a pair of imaging units provided at a stereo camera.

12. A display method of causing an information processing apparatus to display a guide screen, the information processing apparatus obtaining an image captured via three-dimensional image shooting, the display method comprising:
   determining, for a predetermined subject distance and on the basis of two images with different parallaxes that have been captured by a plurality of imaging units that perform three-dimensional image shooting, a common visual field range of the two images with different parallaxes;
   calculating, as a common visual field rate, a ratio between an overall visual field range of one of the plurality of imaging units that is specific to the predetermined subject distance and the determined common visual field range; and
   displaying, on a display of the information processing apparatus, a guide screen that includes information on the determined common visual field range.

13. A non-transitory computer-readable medium storing a computer program for causing a computer of an information processing apparatus to perform guide-screen displaying, the information processing apparatus obtaining an image captured via three-dimensional image shooting, the computer program comprising the steps of:
   determining, for a predetermined subject distance and on the basis of two images with different parallaxes that have been captured by a plurality of imaging units that perform three-dimensional image shooting, a common visual field range of the two images with different parallaxes;
   calculating, as a common visual field rate, a ratio between an overall visual field range of one of the plurality of imaging units that is specific to the predetermined subject distance and the determined common visual field range; and
   displaying a guide screen that includes information on the determined common visual field range.

* * * * *